Feb. 21, 1933. F. M. REID 1,898,854
SEMITRAILER FRAME CONSTRUCTION
Filed March 15, 1930 2 Sheets-Sheet 2
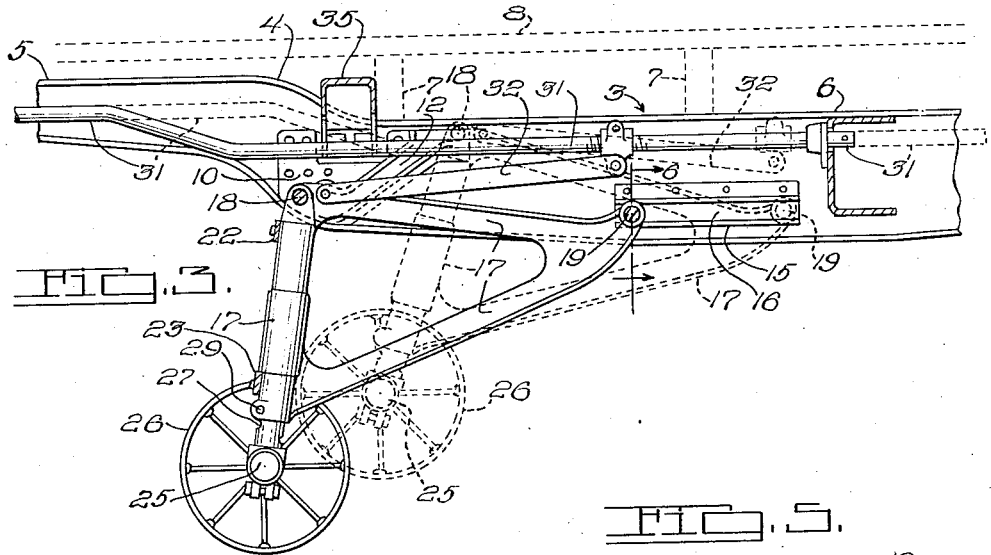
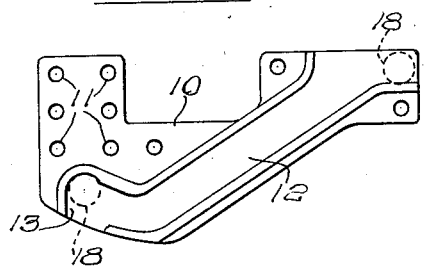
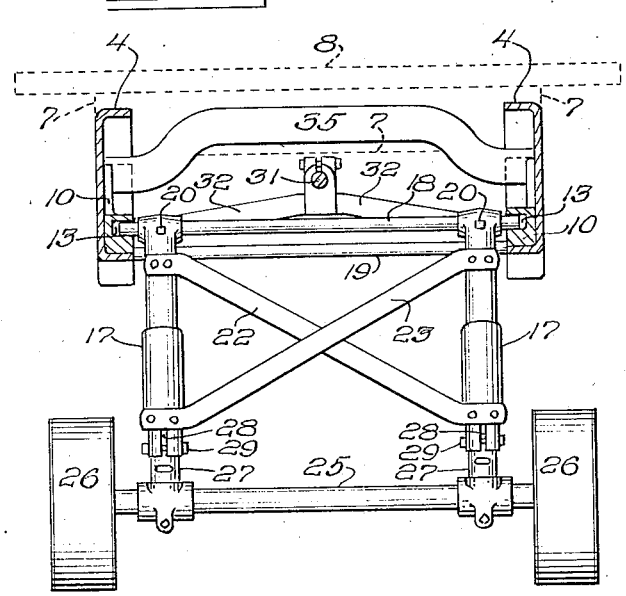
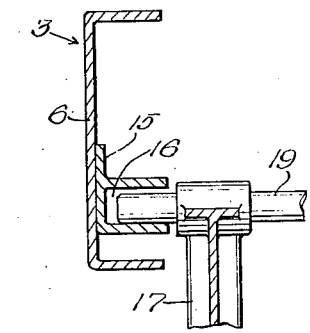
Frederick M. Reid
INVENTOR
by Stuart C. Barnes
ATTORNEY Patented Feb. 21, 1933

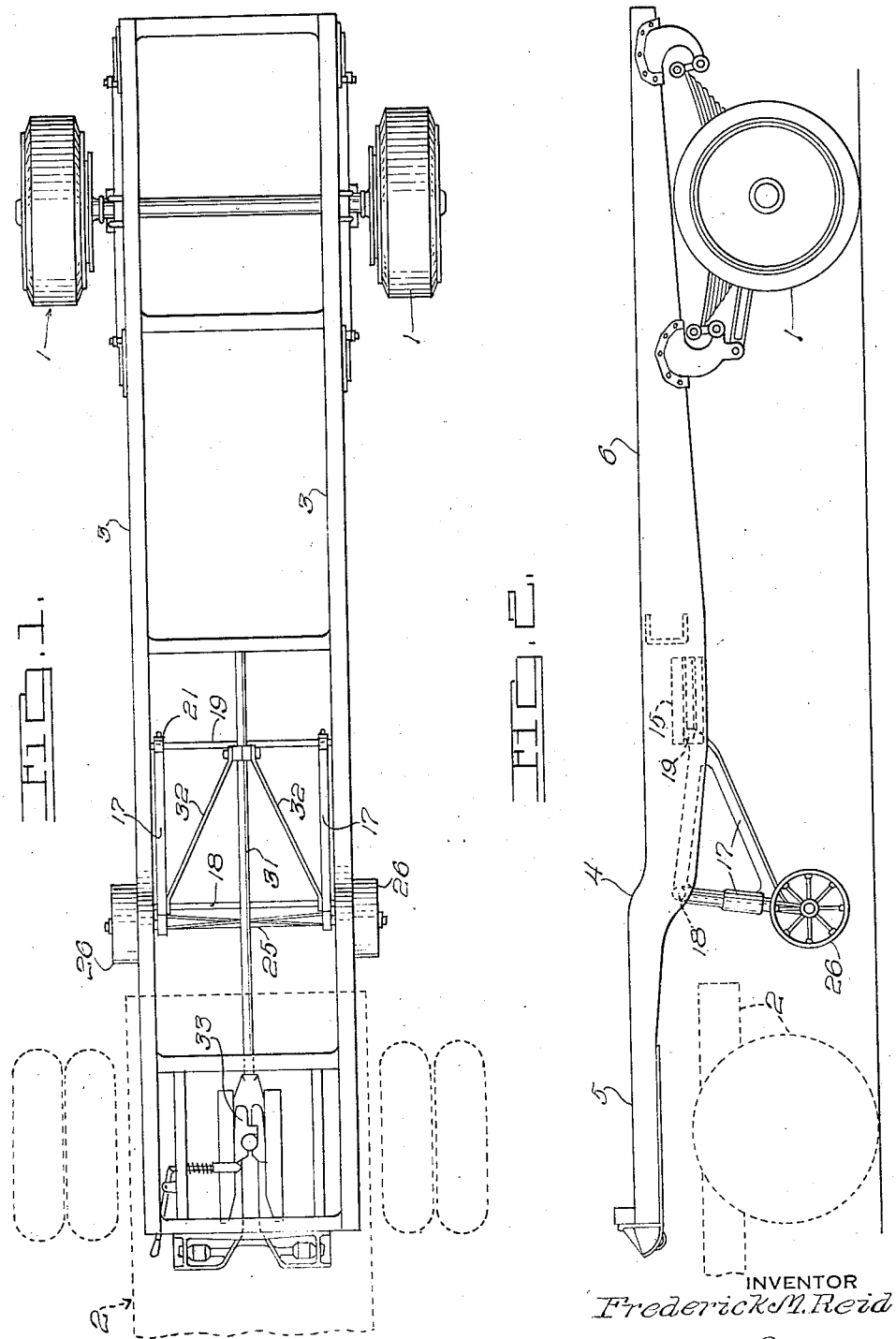

1,898,854

UNITED STATES PATENT OFFICE

FREDERICK M. REID, OF DETROIT, MICHIGAN, ASSIGNOR TO FRUEHAUF TRAILER COMPANY, OF DETROIT, MICHIGAN, A CORPORATION OF MICHIGAN

SEMITRAILER FRAME CONSTRUCTION

Application filed March 15, 1930. Serial No. 436,173.

This invention has to do with a semi-trailer frame construction and it relates especially to a particular frame construction and formation designed essentially to receive a body in such a manner that the floor is kept as low to the ground as possible, having due regard for the fact that the forward end of the trailer lies above the tractor frame. The frame members are to be made, preferably, from pressed steel, and advantageously of channel formation, and generally of lighter stock than that used heretofore in semi-trailer frames with the construction providing for differential frame widths or channel widths in order to give sufficient frame strength where required without increasing frame height. In addition to this the invention contemplates a novel mounting of the semi-trailer support and operating mechanism within the frame channels which face inwardly, and also in this regard a simplified supporting structure is provided.

In the accompanying drawings:

Fig. 1 is a plan view of a semi-trailer frame constructed in accordance with the invention illustrating the rear portion of a tractor vehicle.

Fig. 2 is a side elevation thereof.

Fig. 3 is a view cut through the frame at its forward end illustrating the support mounting and showing two extreme positions of the support, one in dotted lines.

Fig. 4 is a front view of the support showing the frame in cross section.

Fig. 5 is a detail view of the support bracket.

Fig. 6 is a section taken substantially on line 6—6 of Fig. 3.

The semi-trailer, as shown in Figs. 1 and 2, comprises a frame having a running gear 1 at its rear end, but its forward end is designed to rest upon a tractor vehicle 2. The frame comprises at least two longitudinally extending frame members 3, preferably, of channel formation, as illustrated in Fig. 6. Preferably, the frame members are of pressed steel and are mounted so that the channel faces inwardly.

Heretofore, it has been the general practice to make semi-trailer frames from structural steel wherein structural steel elements were suitably fabricated for forming the frame members. Inasmuch as the forward end of the semi-trailer is supported upon the rear end of a tractor, the semi-trailer frame was located higher than the tractor frame. In order that the top of the semi-trailer frame be kept as low to the ground as possible so that a body placed thereon would have its floor located as low as possible, the structural steel members were arranged so as not to have too great a vertical height. In order to have frame members of this kind sufficiently strong considerable weight in them was necessary. In other words, semi-trailer frame members of pressed steel need a greater vertical dimension, or what is ordinarily termed width, than the frames made up of the heavier structural steel. But it has not been feasible to use such frames because they were necessarily located relatively high and their relatively great vertical dimension elevated the body floor to an undesirable height.

This present invention overcomes these difficulties and provides a trailer frame which may advantageously be made of pressed steel having a sufficient width in its members to meet the load requirements, and yet in which the body floor is not manually elevated; also in this regard, the frame is of such construction as to take the more or less standardized form of body with its cross braces without material alteration.

The channel frame members at their forward end, where they lap over the tractor, are preferably given a width sufficient for the purpose but less than the central parts of the frame; this is well illustrated in Fig. 2. Also the rear end of the frame members have less width than the central portion. It will be readily appreciated that when a load is placed on a semi-trailer frame the forward end and rearward ends of the frame are subjected substantially only to compressive forces, whereas the central portion of the frame is given a bending stress. To meet this, the frame members are formed so that their central portion has a greater vertical dimension or a greater width, and in this regard, it is advantageous to provide this width by a gradual increase. This is effected by increasing the width in a downward direction rather than up, as well shown in Fig. 2.

In order to further lower the frame, the same may be offset or dropped, as at 4. It will be noted that at this offset, the frame, in addition to taking an angular offset direction, is also increasing in width from front to rear. Due to this offset the platform frame comprises, generally, two parts located in different horizontal planes, the forward part, as referenced 5, being higher than the rearward part 6. The part 6 comprises the major portion of the frame and carries a major portion of the load, but the tapered formation of the frame begins to give the frame an increased width even in the forward part 5. The fact that the frame is located in these two different horizontal planes is advantageous from the standpoint of mounting the body thereon. It is customary that the body come equipped with transverse supporting and brace members 7 (Fig. 3) underlying the floor 8 of the body. With the frame construction thus described such a body construction can be placed directly upon the trailer frame; it may be necessary to remove a forward transverse body supporting member, as the forward end of the floor of the body lies closely to the frame part 5.

In the main, however, the body can be placed right on the frame without altering or removing the body members 7. Thus it is that the body floor is maintained as low as possible because the part 5 need not be of great width. Its width may be less than that required in a fabricated structural steel frame. This is a controlling factor because in a body having a level floor, or a floor in a common plane, the height at the forward end which overlies the tractor controls floor height. By minimizing frame width at this point and increasing frame width in a downward direction the floor of the body is kept low. A frame of relatively light stock can be used due to the fact that it has adequate width; in addition to this, the drop construction facilitates mounting of the body.

It is preferable that the channels be faced inwardly, but heretofore in semi-trailers they have been faced outwardly in order to provide for the mounting, within the frame members, of the supporting structure. In accordance with the present invention the channels are faced inwardly and the several parts for the mounting of the support are arranged to be carried by and within the channels. In the type of support shown a suitable member, which may be a casting, is illustrated at 10, is designed to be secured within the channel formation, as illustrated in Figs. 3 and 4, and which may be accomplished by suitable rivets taken through apertures 11, and this casting has an inclined guideway 12 and a forward notch 13. Another support element 15, which may be a casting, is also fixed within the channel (Fig. 6) and it has a horizontal guideway 16.

The supporting structure comprises a pair of side members, each of which is of rigid construction and may be of one-piece casting. These side members are generally of triangle shape and are illustrated at 17. At one of the upper corners the two side members are equipped with a cross bar 18, the ends of which ride in cam guideways 12. At the rearward corner another cross bar 19 connects the member 17 and its ends run in the guideways 16; the frame members may have sleeve formations through which these rods extend and which are secured thereto as by means of set screws 20 and 21. A pair of cross braces 22 and 23 between the side members of the support may be used. At the lower corner there is a transverse axle 25 carrying ground-engaging wheels 26, the axle being directly carried by posts 27. The members 17 are hollow for a portion of their length to receive the posts, and are split, as at 28, so they may be contracted by a bolt 29; this bolt is designed to extend through a notch 30 in the post, there being a number of notches, to thus permit of vertical adjustment.

The support is movable in the guide devices to and from the positions illustrated in Fig. 3, and this may be accomplished automatically as by means of a service bar 31 connected to the support through the means of links 32 and also connected to a locking device 33 which locks the trailer to the tractor. This locking device moves to and from locked position and in such movement reciprocates the service bar which in turn causes the supports to move. This general idea, however, is now appreciated in the art and need not to be gone further into. The frame members are of sufficient width to accommodate the support guides and to afford for sufficient vertical movement. The service bar may be offset, as at 34 (Fig. 3) in order that it may be worked in the frame construction, and the frame cross member at this point, illustrated as at 35, is preferably bowed upwardly to clear the same. The preferred arrangement is that the inclined guideway for the support is located just rearwardly of the drop 4 in the frame.

I claim:

1. In a semi-trailer, a frame comprising inwardly facing channel members an offset in the members between their forward ends and central portions, said members having greater width in their central portions than at their forward ends, a support, and inclined guideways in which the support is movable, said guideways being located within the channel formations and disposed against the backs of the channels and immediately to the rear of the offset in the channel members.

2. In a semi-trailer, a frame comprising inwardly facing channel members an offset in the members between their forward ends and central portions, said members having greater width in their central portions than at their forward ends, a support, and inclined guideways in which the support is movable, said guideways being located within the channel formation, positioned against the backs of the channels and located immediately to the rear of the offset in the channel members, the width of the frame at said guideways being sufficient to permit of adequate vertical movement to the support.

In testimony whereof I affix my signature.

FREDERICK M. REID.